United States Patent [19]

Segesman

[11] 4,340,934
[45] Jul. 20, 1982

[54] METHOD OF GENERATING SUBSURFACE CHARACTERISTIC MODELS

[75] Inventor: Francis F. Segesman, Ridgefield, Conn.

[73] Assignee: Schlumberger Technology Corporation, New York, N.Y.

[21] Appl. No.: 19,918

[22] Filed: Mar. 12, 1979

Related U.S. Application Data

[63] Continuation of Ser. No. 177,940, Sep. 7, 1971, abandoned.

[51] Int. Cl.³ .................. G06F 15/20; E21B 47/00
[52] U.S. Cl. .................. 364/422; 324/323; 324/339; 324/351
[58] Field of Search ............ 364/421, 422; 340/18 R, 340/860; 324/1, 6, 323, 339, 351; 73/151, 153

[56] References Cited

U.S. PATENT DOCUMENTS

| | | | |
|---|---|---|---|
| 3,166,709 | 1/1965 | Doll | 324/1 X |
| 3,405,349 | 10/1968 | Moran | 340/18 R X |
| 3,457,496 | 7/1969 | Schuster | 324/1 |
| 3,457,497 | 7/1969 | Schuster | 324/1 |
| 3,457,499 | 7/1969 | Tanguy | 324/1 |
| 3,457,500 | 7/1969 | Schuster | 324/1 |

*Primary Examiner*—Jerry Smith
*Attorney, Agent, or Firm*—Cooper, Dunham, Clark, Griffin & Moran

[57] ABSTRACT

A method of computer generating a subsurface characteristic model which is substantially consistent with readings taken in a well with a well logging device. A set of actual measurement values which represent readings taken over a given depth interval of a well is derived. An initial trial model of the subsurface characteristic under investigation is then selected. Next, a set of simulated measurement values is generated by applying the approximate response characteristic of the logging device to the discrete trial model. The simulated measurement values are compared with the actual measurement values and the initial trial model is then modified in accordance with the comparision. The modified trial model is utilized to form a new set of simulated measurements which are, in turn, compared with the true measurement values. The model can then be remodified and the procedure continued in iterative fashion until there is obtained a model which yields acceptable simulated measurement values; i.e., simulated measurement values which approximately correspond to the actual measurement values. When such a model is obtained there is good indication that the model values are a useful approximation of the subsurface characteristic being investigated.

26 Claims, 14 Drawing Figures

METHOD OF GENERATING SUBSURFACE CHARACTERISTIC MODELS

This is a continuation of application Ser. No. 177,940 filed Sept. 7, 1971 and now abandoned.

BACKGROUND OF THE INVENTION

This invention relates to methods for generating models of the subsurface characteristics of a well and, more particularly, to a method of generating a subsurface characteristic model which is consistent with readings taken in a borehole with a well logging device.

The subject matter of this invention is related to subject matter disclosed in the following U.S. patent applications, each filed of even date herewith and assigned to the same assignee as the present invention: U.S. application Ser. No. 019,926 of C. Regat; U.S. application Ser. No. 019,925 of W. Kenyon; and U.S. application Ser. No. 019,917 of J. Suau and W. Frawley.

In the drilling of an oil or gas well it is advantageous to obtain as much information as possible about the nature of the formations or beds surrounding the drilled borehole. To this end, well logging devices are lowered into the borehole to measure various characteristic properties of surrounding formations. In electrical logging, for example, a device which includes an electrical sensor is moved through the borehole and provides indications of the electrical resistivity or conductivity of the subsurface materials at different depth levels.

For many well logging applications it is desirable that the logging device respond only to a very limited portion of the formation material; i.e., the portion that is adjacent the device at the time a measurement is taken. This is not easily accomplished, however. Ideally, it would be desirable for the vertical resolution of the device to be sharpened such that the apparatus will respond to formation material only over a vertical interval of very narrow extent. This would enable relatively thin beds to be more readily distinguished and their characteristics to be more accurately measured. At the same time, it is often desirable for the logging device to have a reasonably extensive capability of investigation in a horizontal or radial direction. Not surprisingly, the two considerations are found to be countervailing.

Consider, as an example, the type of well logging apparatus known as an "induction logging" device which includes, inter alia, transmitter and receiver coils mounted in spaced relation on a sonde. Alternating current is applied to the transmitter coil and the alternating magnetic field thereby created generates eddy currents in the formations surrounding the borehole. The eddy currents, in turn, create a secondary magnetic field which induces an electromotive force in the receiver coil. The intensity of the eddy currents is a function of the formation conductivity which can therefore be measured by monitoring the induced electromotive force. The basic principles of induction logging are described in an article by H. G. Doll entitled "Introduction to Induction Logging and Application to Logging of Wells Drilled with Oil Base Mud" which appeared in the June 1949 issue of the Petroleum Transactions of the AIME. Among the techniques which have been devised for sharpening (or "focusing") the vertical response of induction logging devices is to provide additional coils on the sonde. These "focusing coils" are utilized in phased relationship with the basic transmitter and receiver coils to effectively cancel portions of the device response which are above and below the central investigative region of the device. Unfortunately, the use of numerous additional coils in this manner tends to significantly decrease the horizontal range of the device, so there is a practical limit on the degree of such focusing which can be employed. Also, the required additional elements render the device more complex and expensive.

In addition to focusing methods which relate to the overall response characteristic of the downhole device, there have been previously developed vertical resolution improvement methods which are termed "computed focusing" techniques. Generally speaking, computed focusing techniques utilize signals which are, at a given instant, more representative of the formation material in the undesired regions to adjust or correct the signal which is, at the same instant, more representative of the desired region. Computed focusing techniques are described, for example, in U.S. Pat. No. 3,166,709 of H. G. Doll, U.S. Pat. No. 3,230,445 of W. J Sloughter et al, and U.S. Pat. No. 3,457,496 of N. Schuster. These patents describe systems that receive signals from a downhole sensing device and generate computed signals which approximate the response that would have been obtained from a sensing device having a sharper response characteristic. Each of the referenced patents discloses a relatively uncomplicated analog apparatus which can be utilized at a wellsite to produce an on-the-spot log. The apparatus temporarily stores signals obtained at various vertically spaced levels in a borehole and then combines the stored signals in appropriate manner to obtain effective log readings with improved vertical resolution.

While the signal processing techniques disclosed in the referenced patents provide useful results, the logs produced with these techniques nonetheless represent subsurface readings taken with a device having an effective response of substantial (though improved) vertical extent. To visualize the actual subsurface characteristics which, when measured, had produced the log, one must still take into account this effective response. Accordingly, it is one of the objects of the present invention to provide a method for generating a subsurface characteristic model which is consistent with readings taken with a device having an effective response of substantial vertical extent.

SUMMARY OF THE INVENTION

The present invention is directed to a method for generating a subsurface characteristic model which is substantially consistent with readings taken in a well with a well logging device. The method is preferably implemented by utilizing a general purpose digital computer which may typically be located at a site which is distant from the well. Briefly, the first step of the invention comprises the deriving of a set of "true measurement values" (to be defined) which represent the readings taken over a given depth interval of the well. An initial discrete trial model of the subsurface characteristic is then selected. As will be seen below, this initial model may be taken from the set of true measurement values. Next, a set of simulated measurement values are generated by applying the approximate response characteristic of the logging device to the discrete trial model. The simulated measurement values are compared with the true measurement values and the initial trial model is then modified in accordance with the comparison. Now, the modified trial model can be utilized to form a new set of simulated measurements which are, in turn, compared with the true measurement values. The model can then be remodified and the procedure continued in this iterative fashion until a model which yields acceptable simulated measurement values is obtained.

In a preferred embodiment of the invention the comparison between a particular true measurement value (at a certain depth level) and its corresponding simulated measurement value yields an error value (at that depth level). The various error values are utilized in modifying the discrete trial model during the next iteration.

Further features and advantages of the invention will be better understood from the following detailed description when taken in conjunction with the accompanying drawings.

DESCRIPTION OF THE PREFERRED EMBODIMENT

Figure 1:
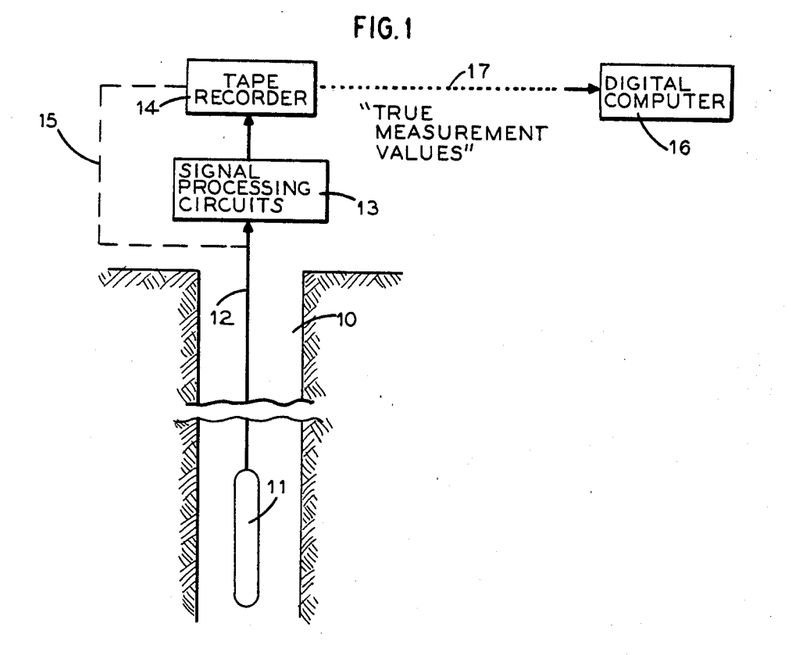
FIG. 1 is a functional diagram of a system for producing and processing well logging measurements representative of the subsurface characteristics of a well.

Referring to FIG. 1, there is shown a functional diagram of a system for producing and processing well logging measurements representative of the subsurface characteristics of a well or borehole 10. An investigating device 11 is suspended in the borehole on a cable 12. The length of the cable 12, which determines the relative depth of device 11, is controlled by suitable mechanical depth control means such as a drum and winch mechanism (not shown). The signals from investigating device 11 are coupled via cable 12 to signal processing circuitry 13 which, inter alia, converts the signals to a digital form for recording on a tape recorder 14. As is conventionally practiced, the tape recorder 14 is synchronized with the depth control means, such synchronization being depicted in FIG. 1 by the dashed linkage 15. The digital signals recorded on tape represent measurements taken at various depths in the borehole, typically measurements taken at six inch sampling intervals. The taped measurements are carried or transmitted via communications link to a computer center and entered in a prescribed fashion in a digital computer 16, as is repesented by the dotted arrow 17. The computer 16 receives as an input a "derived" set of "true measurement values".

As defined herein, "true measurement values" is a generic term which describes the readings taken in a well with a well logging device. The readings may relate to any type of subsurface characteristic, but most typically would relate to conductivity or resistivity. The readings may be subject to little or no signal processing or to complex processing, coding/decoding or the like. For example, the readings may be utilized in the very form in which they are received from a simple logging device. On the other hand, the readings may be subjected to computed focusing techniques (referenced above), encoding for recording and transmission, decoding, etc., before being entered in the computer. In any event, the "true measurement values" represent, in some form, actual measurements taken in a well or borehole. The contrast of this term with the term "simulated measurement values" will become later apparent.

The term "deriving" as used herein, is also generic and is intended to include in its definition the acts of measuring or of recovering measurements previously taken. In the simplest sense, therefore, the "deriving" of measurements may consist merely of measuring well log readings. On the other hand, the deriving of measurements may consist, for example, of recovering previously taken well log readings from a recording tape or from the receiver of a communications link.

It should be noted here that the particular type of logging device, signal processing circuitry, and recording and communications means utilized to obtain true measurement values is a matter of convenient choice. Indeed, if an appropriate computer were available at the wellsite it would be possible to enter measurement values directly without recording or transmitting these values. As will become understood, the principles of the invention are applicable to different types of true measurement values having a variety of past histories. For ease of illustration, however, let us assume that the device of FIG. 1 is of the conventional induction logging type which measures conductivity (or resistivity), that no computed focusing techniques are employed in the signal processing circuits 13, and that the measurement values recorded on tape are carried to the location of a general purpose digital computer.

In the discussion that follows, use will be made of diagrams representing the cross-section of the ground intercepted by a vertical plane containing the axis of a borehole. Each "region" of ground—which means here a volume of ground having a symmetry of revolution around the borehole—will be represented on such diagrams by its cross-section by the plane of the figure. When dealing with the response of a borehole investigating device it is convenient to make use of descriptive vehicle known as the "vertical geometrical factor". The vertical geometrical factor, and especially its application to induction logging devices, is explained in the abovereferenced Doll article and the above-referenced patents of Doll, Sloughter and Schuster. The vertical geometrical factor takes into quantitative account the fact that the sensitivity region of a logging device positioned at a given measure point actually extends over a substantial vertical region above and below such measure point. The vertical geometrical factor effectively "weights" the contributions to overall device response of different layers of ground depending on their vertical distance from the measure point.

Figure 2:
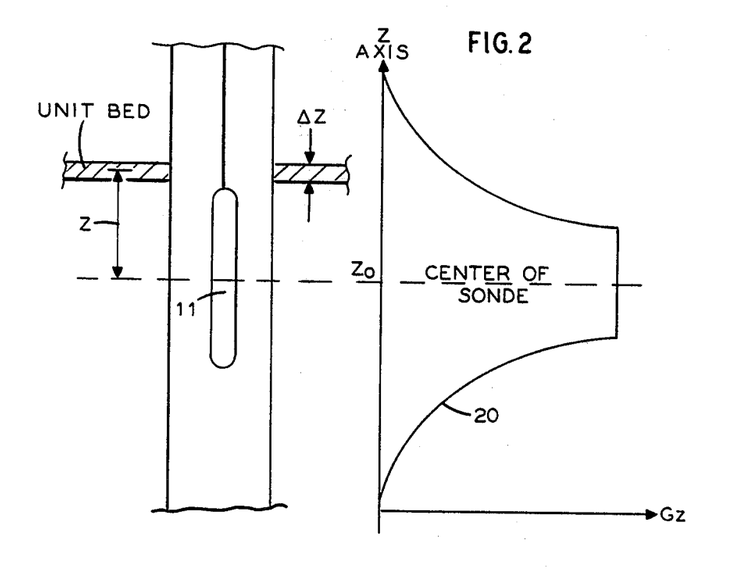
FIGS. 2 and 3 are representations of the response characteristic of well logging devices which are helpful in describing the concept of vertical geometrical factor.

An understanding of the vertical geometrical factor associated with an induction logging device can be gained with the aid of FIG. 2 which depicts an induction sonde positioned at a depth $z_o$ (as determined by the center or so-called "measure point" of the sonde). Assume that all space around the borehole is divided into an infinite number of horizontal beds of minute thickness $\Delta z$, each referred to as a "unit bed" and characterized by its altitude z with respect to the measure point, $z_o$. The vertical geometrical factor of each such unit bed (i.e., its contribution to device response) is designated $G_z$, and the curve 20 is an approximate plot of the $G_z$'s vs. z for a typical induction logging device. The curve 20, referred to as the "vertical investigation characteristic" of the device, is normalized to unity by setting $\Sigma G_z \Delta z = 1$, or, in the limit as $\Delta z \rightarrow 0$, $$\int_{-\infty}^{+\infty} G_z dz = 1.$$

Figure 3:
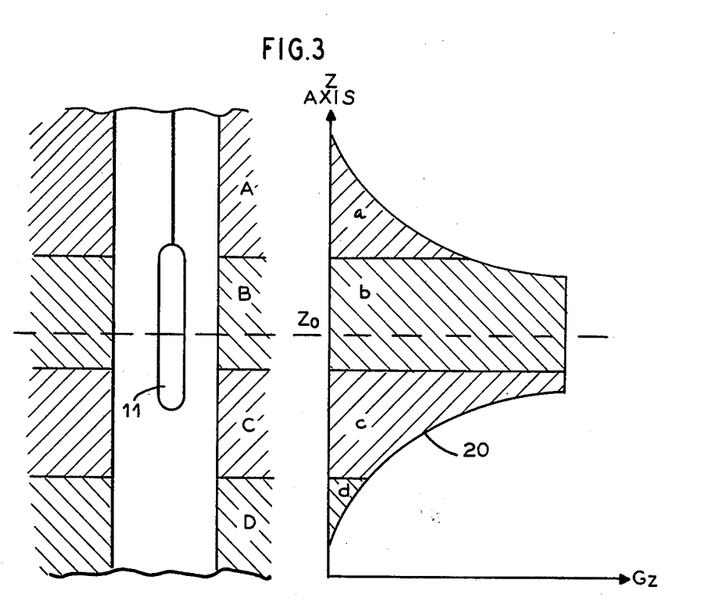

Consider, now, the four beds, A, B, C and D, of finite thickness shown in FIG. 3. The vertical geometrical factors of the beds, $G_A$, $G_B$, $G_C$ and $G_D$ are equal to their corresponding relative areas under the curve 20, i.e.,:

$$G_A = \frac{a}{a+b+c+d}$$

$$G_B = \frac{b}{a+b+c+d}$$

$$G_C = \frac{c}{a+b+c+d}$$

$$G_D = \frac{d}{a+b+c+d}$$

In view of the normalization just mentioned, $a+b+c+d$ equals one, so that $G_A=a$, $G_B=b$, $G_C=c$ and $G_D=d$. Now, if we designate $\sigma_A$, $\sigma_B$, $\sigma_C$ and $\sigma_D$ as the four bed conductivities, the response $L(z_o)$ of the logging device 11 at the depth $z_o$ (i.e., the measured log reading at that depth) can be expressed as $$L(z_o) = G_A\sigma_A + G_B\sigma_B + G_C\sigma_C + G_D\sigma_D \quad (1)$$

or, $$L(z_o) = a\sigma_A + b\sigma_B + c\sigma_C + d\sigma_D \quad (1A)$$

Generally, the response of the logging device at a depth z is $$L(z) = \Sigma G_i \sigma_i \quad (2)$$

where the summation is taken over all beds falling within the response range of the device, and the $\sigma_i$'s and $G_i$'s are the respective conductivities and vertical geometrical factors of these beds. As stated, the vertical geometrical factor of a particular bed is seen to be dependent upon the location of the bed with respect to the device's measuring point. For example, in FIG. 3, if the device were moved to an altitude slightly above $z_o$, the vertical geometrical factor of bed A (viz., area a) would become larger while the vertical geometrical factor of bed D (viz., area d) would become smaller.

The problem associated with utilizing a device having a relatively wide vertical response, as previously discussed, should now be readily apparent. For example, referring again to FIG. 3, the measure point $z_o$ of device 11 is located in the approximate center of bed B and, ideally, the device should be indicating a reading which only reflects the conductivity, $\sigma_B$, of bed B. However, the reading indicated by the logging device will, in reality, be determined by equation (1) or (1A) wherein $L(z_o)$ depends upon the conductivities $\sigma_A$, $\sigma_C$, and $\sigma_D$ as well as upon $\sigma_B$. It should be noted in this context that the relative width of the device response must be considered with relation to the width or thickness of the beds being examined. This can be illustrated, for instance, by considering the case where bed B is relatively wide and extends over the entire depth interval depicted in FIG. 3. In such case the reading taken at $z_o$ would be equal to $G_B\sigma_b$, there being no other beds lying within the device resonse curve. Also, due to the unity normalization of the vertical geometrical factor, $G_B$ would equal one so that the logging device would indicate a reading which substantially equals $\sigma_B$, the actual conductivity of bed B. Unfortunately, formation beds encountered in real-life situations are often substantially thinner than the effective device response width.

The technique of the present invention enables determination of a useful model of subsurface bed conductivity values notwithstanding the vertical resolution limitations of well logging devices. In obtaining a meaningful model it is helpful to assume that the subsurface formations being studied consist of well-defined beds of finite width each having a conductivity (or other measured parameter) which is essentially constant within the bed. Such simplifying assumptions are not strictly accurate, of course, since formation beds deposited by nature are not exactly homogeneous and well defined. Stratified geological models of the type utilized herein are, however, generally consistent with natural depositional considerations and are expedient since exact geological solutions are not feasible in a practical sense.

Figure 4A:
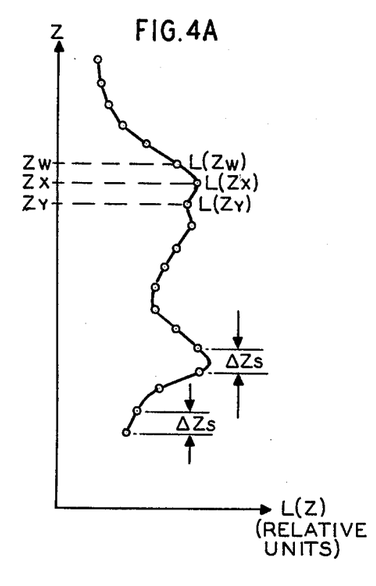
FIG. 4A is a log of conductivity readings taken at specified sampling intervals.
Figure 5:
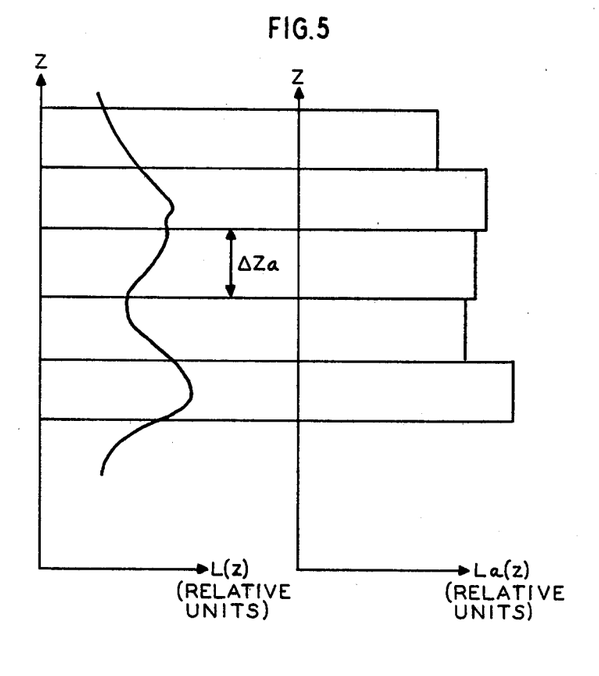
FIG. 5 shows a log of conductivity readings and a corresponding graph of averaged conductivity readings.

The tape of recorder 14 of FIG. 1 has recorded thereon a set of true measurement values taken over a given depth interval of the well 10. Referring to FIG. 4A, there is illustrated a "log" of conductivity readings $L(z)$ taken at sample intervals denoted $\Delta z_s$. As was previously indicated, $\Delta z_s$ is typically six inches, but it will become clear that the method of the invention is not dependent upon the sampling interval and, for examples, readings derived from a "continuous" log could be readily utilized herein. (The resolution of the original log is, however, limited by the sampling interval, so an unduly large sampling interval is not desirable.) In FIG. 5, the readings over a number of "averaging intervals" of width $\Delta z_a$ are averaged to yield a set of discrete conductivity values $L_a(z)$. The width $\Delta z_a$ can be taken over several sampling intervals and may be, for example, of the order of the two feet. The decision as to whether or not to use a data selection technique such as averaging depends upon chosen limitations on machine computation time, required accuracy of results, and other factors to be discussed hereinafter.

Figure 6:
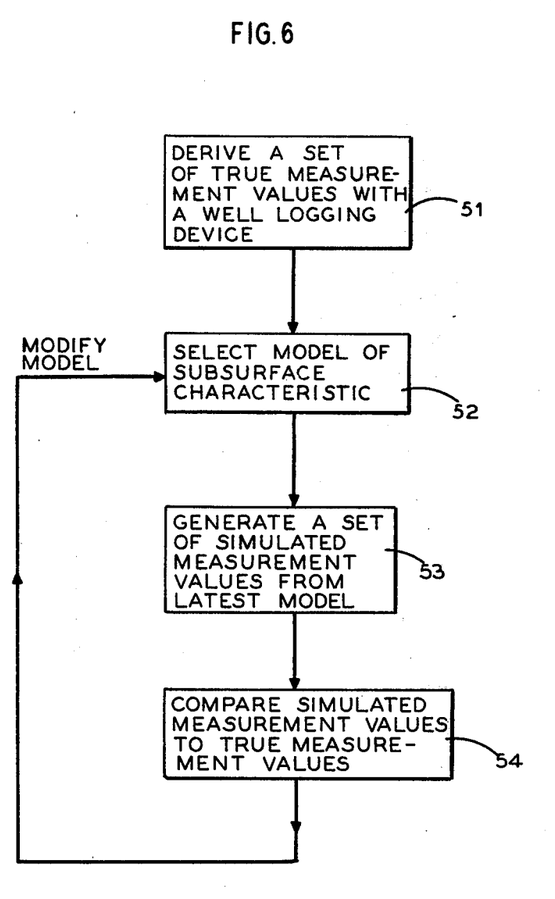
FIG. 6 is a simplified block diagram of the invented method.

Referring to FIG. 6, there is shown a simplified block diagram of the method of the present invention. The block 51 represents the step of deriving a set of true measurement values taken with a well logging device.

Figure 4B:
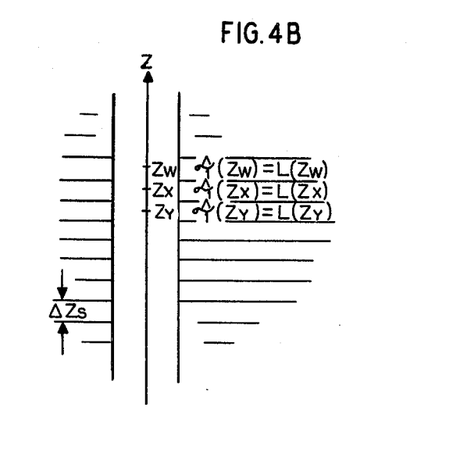
FIG. 4B is a first approximation model of subsurface formations based upon the log of FIG. 4A.

The true measurement values may be, for example, the readings as a function of depth depicted by the points of FIG. 4. These true measurement values are stored in the memory of a digital computer. The next step, as represented by block 52, is to select a discrete model of the subsurface characteristic surrounding the well being investigated. This model may be thought of as a first approximation of the subsurface characteristic being studied. In a preferred embodiment of the invention, the selected model is taken from the true measurement values themselves. Thus, as in FIG. 4B, the model of subsurface formations can be visualized as consisting of a plurality of beds of equal thickness, $\Delta z_s$. The conductivity of each bed in this first model, designated $\hat{\sigma}_1(z)$, is determined by the measured value $L(z)$ at the particular depth level of the bed. For example, at a depth $z_w$, the indicated log reading is $L(z_w)$ (FIG. 4A). Therefore in the model (FIG. 4B), a bed of thickness $\Delta z_s$ is centered at a depth $z_w$ and this bed is assumed to have a conductivity throughout of $L(z_w)$. Similarly, the beds at the depth levels $z_x$ and $z_y$ have respective original model conductivities of $L(z_x)$ and $L(z_y)$, and so on. In the present embodiment, the original model is formed by the computer (from the true measurement values) and stored therein, but an externally generated original model could, if desired, be read into computer memory.

The next step of the method, represented by the block 53 (FIG. 6), is to generate a set of simulated measurements from the latest model, which, for the present state of discussion, is the original model. This is accomplished by applying the approximate response characteristic of the logging device to the simulated model. As used herein for purposes of this step, the term "response characteristic of the logging device" is intended to reflect the overall response of the equipment used to obtain the true measurement values; i.e., the downhole device and any auxiliary equipment such as computed focusing devices and the like. In the illustrative situation of FIG. 1, the induction logging device 11 is assumed to have an approximate vertical response characteristic of the form shown in FIG. 2. For other types of equipment, the approximate response curve may be sharper or broader or, perhaps, asymmetrical.

Figure 7:
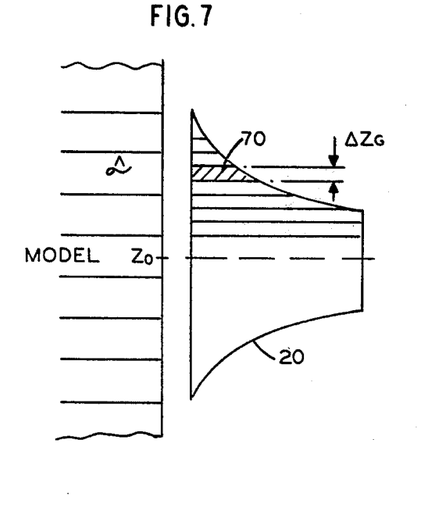
FIGS. 7 and 8 each show a representation of a logging device characteristic as positioned alongside a discrete model of subsurface formations.
Figure 8:
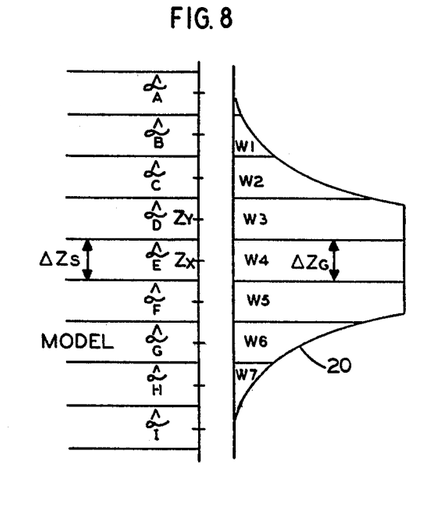

The simulated measurements can be generated by programming the computer to calculate a value at each depth level of interest in accordance with the above equation 2. This process utilizes the vertical geometrical factor concept and is readily visualized with the aid of FIGS. 7 and 8. In FIG. 7, the device's normalized vertical investigation characteristic curve 20 is pictured alongside a conductivity model and centered at a depth level $z_o$. The area under the curve 20 is shown as divided into a plurality of strips of equal width $\Delta z_g$. It follows from the discussion above relating to FIGS. 2 and 3 that the simulated device response can be calculated by multiplying the area of each strip by the conductivity of the model bed adjacent the strip and then summing these products. For example, in FIG. 7, the area of the strip 70 would be multiplied by the adjacent model bed conductivity $\sigma$, and this product added to the similarly computed products for all other strips to obtain the simulated device response at depth $z_o$. The strip areas or "weighting factors", as a function of their distance from the curve center, are fed as input information to the computer which then, using the model conductivities, calculates the desired sum-of-products at each measuring point. To facilitate computer calculation of simulated measurement values, it is convenient to choose a strip width which is an integral submultiple or multiple of the model bed width. If this is not done, it will be necessary to calculate the contributions of strips which overlap adjacent beds of differing conductivities. Thus, for example, in FIG. 8 the strip width $\Delta z_g$ is selected equal to the model bed width $\Delta z_s$. The simulated measurement value at the depth $z_x$, denoted $\hat{L}_1(z_x)$, can be conveniently calculated as $$\hat{L}_1(z_x) = w_1\hat{\sigma}_B + w_2\hat{\sigma}_C + w_3\hat{\sigma}_D + w_4\hat{\sigma}_E + w_5\hat{\sigma}_F + w_6\hat{\sigma}_G + w_7\hat{\sigma}_H$$

where $w_1$ through $w_g$ are the normalized weighting factors of the response curve 20. When the device is "moved" (in the simulated sense) to the next calculation point, $z_y$, the simulated measurement value is seen to be $$\hat{L}_1(z_y) = w_1\hat{\sigma}_A + w_2\hat{\sigma}_B + w_3\hat{\sigma}_C + w_4\hat{\sigma}_D + w_5\hat{\sigma}_E + w_6\hat{\sigma}_F + w_7\hat{\sigma}_G.$$

The simulated measurement value at each point of interest can be calculated in this manner.

Having generated a set of simulated measurements, $\hat{L}_1(z)$ from the original model, the next step of the invention is to compare these simulated measurement values to the true measurement values $L(z)$. This step is represented by the block 54. The comparison, which is performed by the computer, gives indication as to whether or not the model is a faithful approximation of the subsurface characteristics being dealt with. If the simulated measurement values $\hat{L}_1(z)$ happen to closely correspond to the true measurement values $L_1(z)$ there would be good indication that the model conductivity values $\hat{\sigma}_1(z)$ are a useful approximation of actual subsurface conductivities. In most cases, however, the initial model values $\hat{\sigma}_1(z)$ will not yield simulated measurement values which adequately compare to the true measurement values. (The comparison criteria is, of course, a function of a prescribed standard of acceptability.) Therefore, the computer is programmed to modify or "enhance" the model conductivity values in accordance with the performed comparison.

In a preferred embodiment of the invention, the computer is programmed to effectively compare $\hat{L}_1(z)$ with $L(z)$ on a point-by-point basis by computing a set of error values $$E_1(z) = L(z) - \hat{L}_1(z).$$

If the error values exceed the prescribed acceptability limitation, the conductivity model values are each modified in accordance with the equation $$\hat{\sigma}_2(z) = \hat{\sigma}_1(z) + \lambda E_1(z)$$

where $\lambda$ is a modification factor to be described hereinbelow, and where the subscript "2" indicates that the model value is from the second composite model to be tried. The second model values are then utilized to generate, in conjunction with the effective device response, a second set of simulated measurement values, designated $\hat{L}_2(z)$. The $\hat{L}_2(z)$ values are compared to the true measured values $L(z)$ to compute a second set of error values in accordance with $$E_2(z) = L(z) - \hat{L}_2(z).$$

If the values $E_2(z)$ do not fall within the prescribed limit, they are used to generate a third conductivity model which, in turn, undergoes simulated logging, and the process is continued in iterative fashion. It follows that the general equation for the $n^{th}$ model conductivity is $$\hat{\sigma}_n(z) = \hat{\sigma}_{n-1}(z) + \lambda E_{n-1}(z). \quad (3)$$

While this modification relationship has been found suitable, it should be pointed out that alternate expressions for modifying the model conductivities in accordance with the error values can be used, for example, $$\hat{\sigma}_n(z) = \hat{\sigma}_{n-1}(z) + (E_{n-1}(z))^{\lambda}.$$

Figure 9:
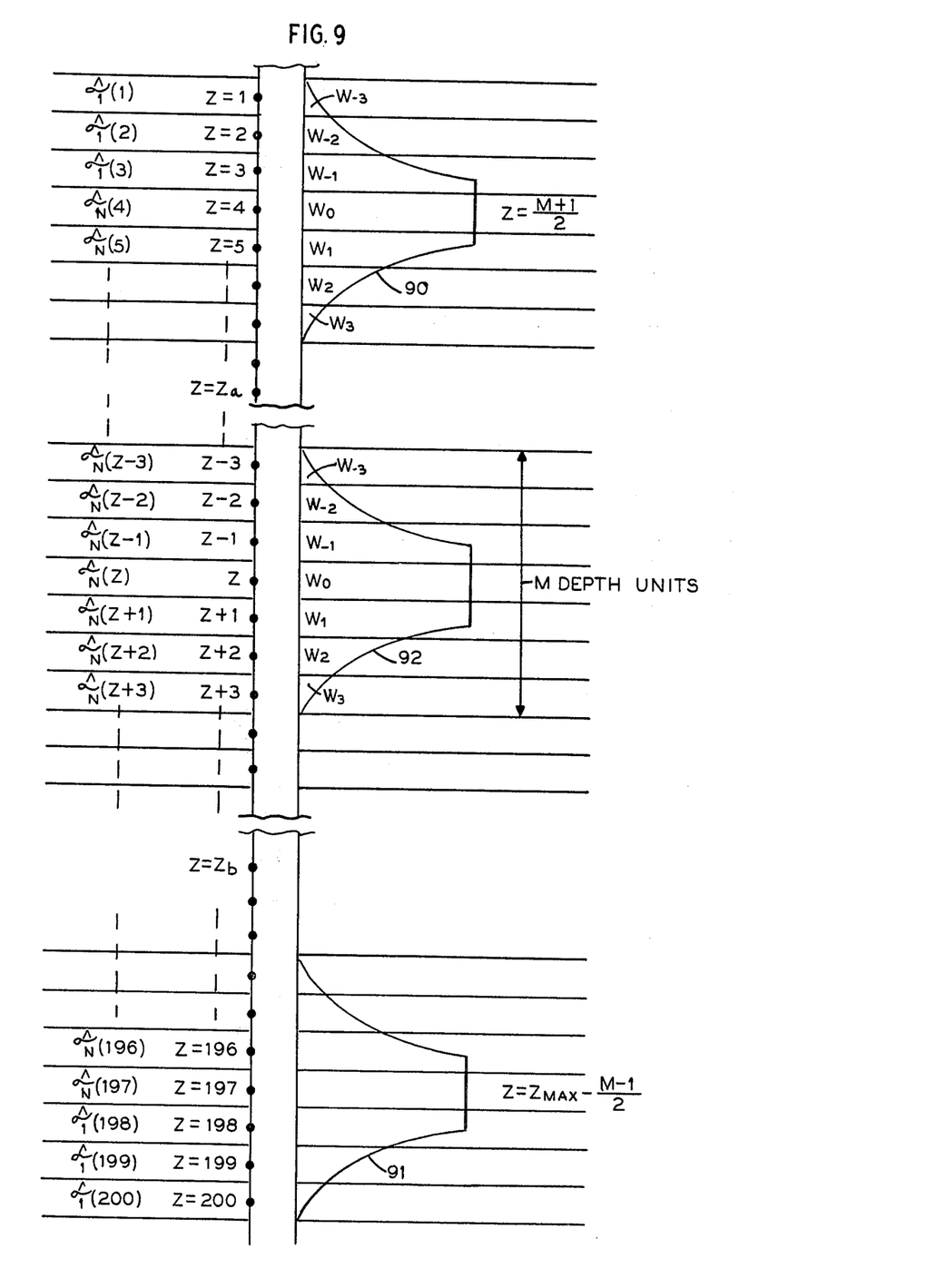
FIG. 9 is a model of a subsurface depth interval to which the method of the invention is applied.

Referring to FIG. 9, there is shown a depth interval under consideration containing successive depth levels designated by $z=1, z=2, \ldots z=200$. An interval of 100 feet (i.e., 200 six-inch samples) has been arbitrarily chosen for consideration, but the interval under consideration can be any convenient size. Also, for purposes of illustration, a logging device response having an effective vertical extent, "M", of seven depth units is shown at various positions alongside the depth interval representation. In practice, the effective device response may typically be of substantially longer vertical extent, for example sixty depth units, but the use of a shorter extent facilitates description of the invention. The response curves 90 and 91 are shown as positioned for taking simulated readings at the "end" measure points $z=4$ and $z=197$, respectively. These depth levels are designated as "end" measure points since all the measure points from $z=4$ to $z=197$ are given to yield responses which depend completely on bed conductivities within the given depth interval. Conversely, the responses at the depth levels $z=1, 2, 3$ and $196, 197, 198$ all depend, in part, on conductivities which lie outside the given depth interval. Therefore, only the model conductivities for $4 \leq z \leq 197$ are to be enhanced by iterative technique. (In general, for an effective vertical extent of M depth units, with M odd, the appropriate interval between and measure points is $$\frac{M+1}{2} \leq z \leq z_{max} - \frac{M-1}{2}$$

where $z_{max}$ and M happen to be 200 and 7, respectively, in FIG. 9.). The beds outside the end measure points, designated "end beds", are assigned original model conductivities $\hat{\sigma}_1(1), \hat{\sigma}_1(2), \hat{\sigma}_1(3)$ and $\hat{\sigma}_1(198), \hat{\sigma}_1(199), \hat{\sigma}_1(200)$, and these values are maintained throughout the iterative method.

A further consideration which relates to "end" effects is that the enhanced model conductivities of beds near the ends of the given interval will be substantially influenced by the non-enhanced model conductivities of the end beds. Such dependent "coupling" to the end beds occurs throughout the given interval, but with lessening effect toward the center of the interval. As a result, it can be expected that the enhanced model conductivity values near the end beds will not be as reliable as those closer to the interval center. Consequently, and in the interest of increased reliability, only the final model conductivity values between the preselected depth levels "$z_a$" and "$z_b$" are to be considered as useful. For the given interval and tool response of FIG. 9, values of the order of $z_a=25$ and $z_b=175$ are considered safe.

The seven geometrical weighting factors associated with the device response are designated, in order of decreasing depth level, as $w_{-3}, w_{-2}, w_{-1}, w_o, w_1, w_2$ and $w_3$. The convenience of this particular subscripting choice will become later apparent.

Figure 10A:
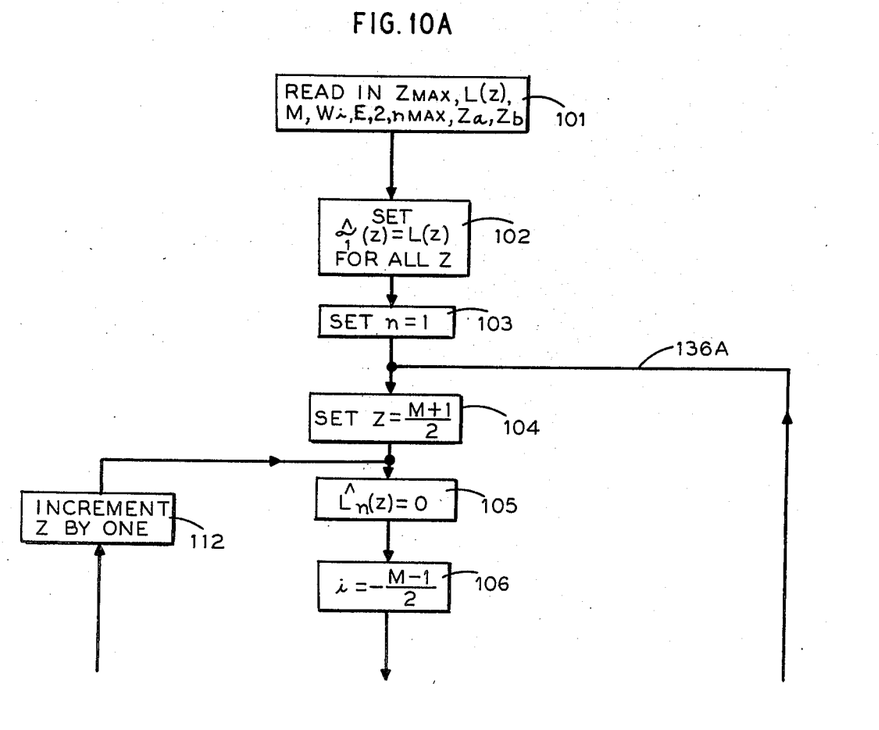
FIGS. 10A, 10B and 10C, when respectively positioned one-below-another comprise FIG. 10 which shows a flow diagram for machine programming an embodiment of the invented method.
Figure 10B:
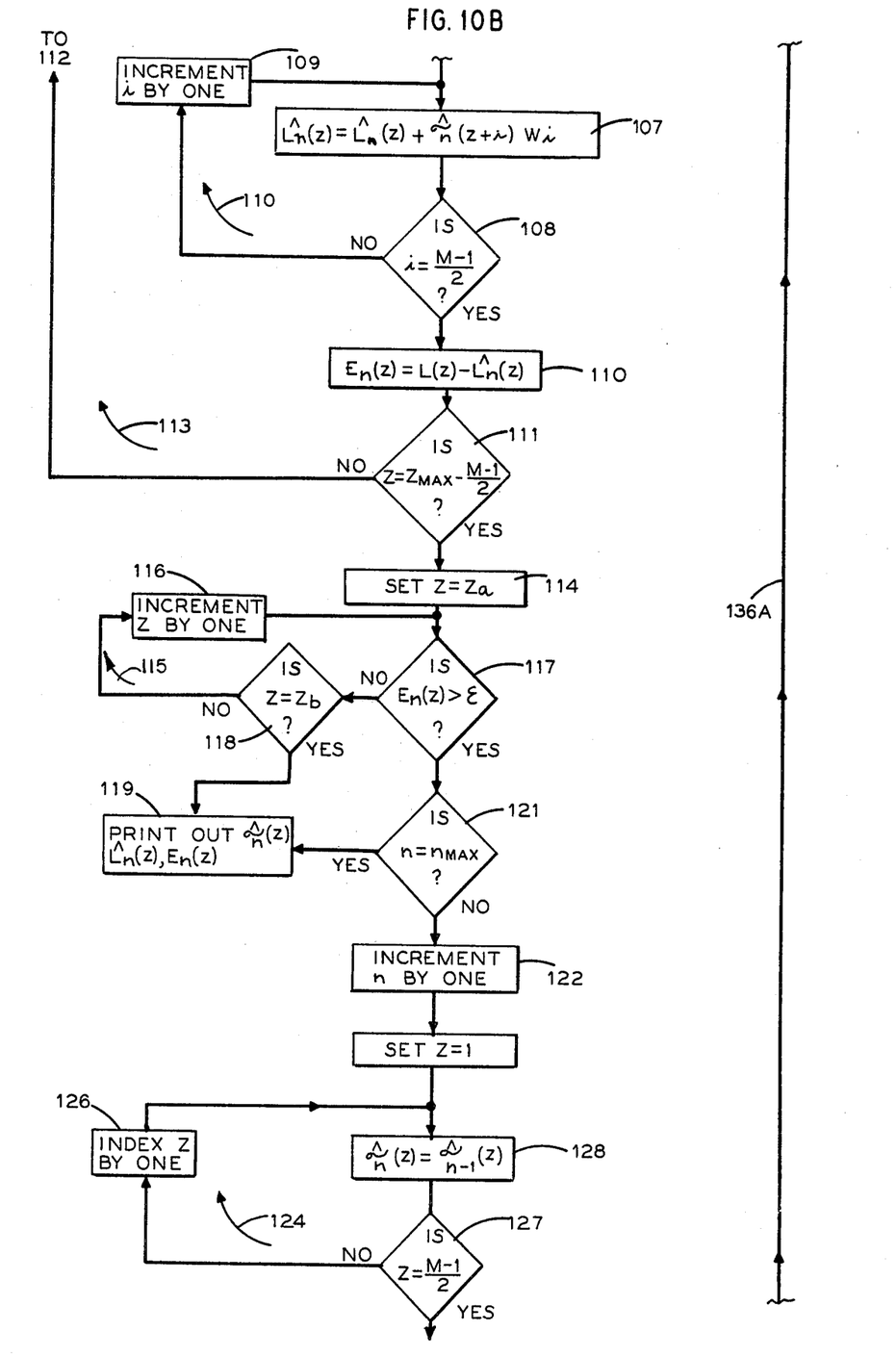
Figure 10C:
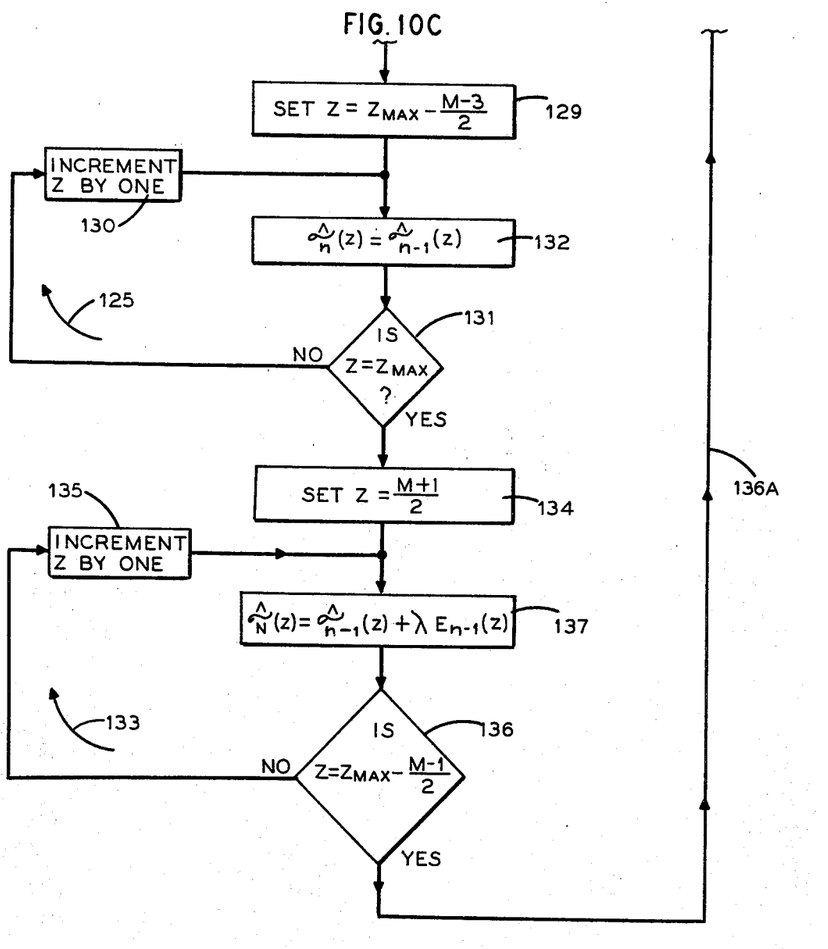

Referring to FIG. 10, there is shown a flow diagram for machine programming the method of this embodiment. The block 101 represents the function of reading into the computer the following parameters, some of which have previously defined:

$z_{max}$ = number of sample intervals comprising the depth interval under consideration (200 in FIG. 9).

$L(z)$ = true measurement values at each depth level in the interval.

M = number of depth units in vertical extent of device response characteristic (7 in FIG. 9).

$w_i$ = geometrical weighting factors associated with the device response characteristic ($w_{-3}, w_{-2} \ldots$ etc. in FIG. 9).

$\epsilon$ = maximum allowable error at any data point.

$n_{max}$ = maximum allowable number of iterations.

$z_a, z_b$ = depth levels between which computed results are read out.

$\lambda$ = modification factor.

The block 102 represents the step of establishing the first model conductivity values, $\hat{\sigma}_1(z)$, as equal to the measured values $L(z)$ at each depth level of the interval. As used herein, the subscript notation "n" for the variables $\hat{\sigma}_n(z), \hat{L}_n(z)$ and $\hat{E}_n(z)$, indicates the current iteration count; so that, for example, $\hat{\sigma}_1(10), \hat{L}_1(10)$ and $E_1(10)$ respectively represent the model conductivity value, simulated measurement value, and error value for the depth level $z=10$ during the first iteration. The index n is initially set to unity, as indicated by the block 103.

The next step of the method is to set the depth level index z to the first value at which an enhanced model conductivity is to be generated; viz, the end measure point $z=(M+1)/(2)$ (block 104). For convenience of illustration the simulated measurements are described with reference to FIG. 9 as being calculated from top to bottom although the true measurement values were, of course, typically taken in the opposite direction. The first simulated measurement value, $\hat{L}_1(z)$, and the first error value $E_1(z)$ are calculated for this first value of z as follows: $\hat{L}_1(z)$ is initialized at zero (block 105) and the index i is set to $-(M-1)/(2)$ (block 106). The value of $\hat{L}_1(z)$ is then increased by an amount $\hat{\sigma}_1(z+i)w_i$ (block 107), i is incremented by one (block 109), and $\hat{L}_1(z)$ again increased by an amount $\hat{\sigma}_1(z+i)w_i$. The small loop, indicated by the loop arrow 110, is seen to continue in this fashion until the value of $\hat{L}_1(z)$ becomes:

$$\hat{L}_1(z) = \sum_{i=-\frac{M-1}{2}}^{i=\frac{M-1}{2}} \hat{\sigma}_1(z+i)w_i, \quad (3)$$

which is the appropriate simulated measurement value at the designated depth level, z. To illustrate the method up to this point, and referring again to FIG. 5, the setting of z to a value $(M+1)/(2)$ (with $M=7$ for FIG. 9) means setting $z=4$ with a resultant simulated device response position as indicated graphically by the curve 90. The range of i for $M=7$ is $-3$ to $+3$, so that the summation of equation (3) becomes:

$$\hat{L}_1(z=4) = \hat{\sigma}_1(1)w_{-3} + \hat{\sigma}_1(2)w_{-2} + \hat{\sigma}_1(3)w_{-1} + \hat{\sigma}_1(4)w_o + \hat{\sigma}_1(5)w_1 + \hat{\sigma}_1(6)w_2 + \hat{\sigma}_1(7)w_3$$

which is seen graphically to be the appropriate sum-of-products for the simulated measurement at the depth level $z=4$. In general, the simulated response $\hat{L}_n(z)$ at a depth level z during the $n^{th}$ iteration can be best visualized from the curve 92 as being $$\hat{L}_n(z) = \sum_{i=-\frac{M-1}{2}}^{i=\frac{M-1}{2}} \hat{\sigma}_n(z+i)w_i,$$

which is the value ultimately calculated in the loop 110.

Referring again to FIG. 10, after generating the simulated measurement value $\hat{L}_1(z)$ for the depth level being considered, an error value $E_1(z)$ is calculated (block 110) as the difference between the true measurement value $L(z)$ and the simulated measurement value $\hat{L}_1(z)$ at that depth level. The depth level index z is then examined to determine if z has reached a value of $z_{max}-(M-1)/2$ (decision diamond 111), and if not, z is incremented by one. Thus, in the larger loop 113, the values of $\hat{L}_1(z)$ and $E_1(z)$ are calculated for all z from $(M+1)/2$ to $z_{max}-(M-1)/2$ (i.e., for $z=4$ to $z=197$ in FIG. 9).

In the next stage of the program the computed values of $E_1(z)$ for all z in the range $z_a \to z_b$ are examined to determine if any computed error in this range exceeds the preselected error threshold value, $\epsilon$. The depth index z is set equal to $z_a$ (block 114) and then, in the loop 115, z is successively incremented by one (block 116) until either the value $E_n(z)$ exceeds $\epsilon$ at some depth level (decision diamond 117), or the depth index reaches $z_b$. Assume, for illustration, that $E_1(z)$ does not exceed $\epsilon$ for any depth level in the range $z_a \leq z \leq z_b$. In this case, there is good indication that the present model conductivity values in the range $z_a \to z_b$ are a useful approximation of actual subsurface conductivities. This being the case, the calculated values of $\hat{\sigma}_n(z)$, $\hat{L}_n(z)$ and $E_n(z)$ are printed out (block 119) and the programmed method is terminated. In most instances, however, the initial model conductivity values $\hat{\sigma}_1(z)$ will not yield acceptable error values over the range $z_a \to z_b$. When an unacceptably large error is reached, the decision diamond 117 directs the program to its next general phase, which involves the modification of the model in accordance with the previously computed error values. The "yes" output branch of the diamond 117 leads to the block 123 via the decision diamond 121.

The index n is next incremented by one (block 122) to a new value of two. The following loops 124 and 125 of the program maintain the second model conductivity values of the "end" beds at the same values which they had in the initial model. The reasons for so doing were set forth above in connection with the description of FIG. 9. The depth level index z is first set equal to 1 (block 123) and then incremented (block 126) until z reaches $(M-1)/2$ (decision diamond 127). For each depth level in the range $1 \to (M-1)/2$ the value of $\hat{\sigma}_2(z)$ is set equal to the previous model conductivity $\hat{\sigma}_1(z)$ at that depth level (block 128). Next, z is set equal to $z_{max}-(M-3)/2$ (which is the first depth level after $z_{max}-(M-1)/2$, as represented by block 129, and then z is incremented (block 130) until z reaches $z_{max}$ (decision diamond 131). For each depth level in the range $z_{max}-(M-3)/2 \to z_{max}$ the value of $\hat{\sigma}_2(z)$ is set equal to the previous model conductivity $\hat{\sigma}_1(z)$ (block 132). Thus, by virtue of the loops 124 and 125 the end beds maintain their initial model conductivities regardless of the value of index n.

In the next stage of the programmed method, indicated by the loop 133, a second set of model conductivities, $\hat{\sigma}_2(z)$ is generated by modifying the initial model conductivities $\hat{\sigma}_1(z)$ in accordance with the initial error values $E_1(z)$. The depth level index z is set to the end measure point $(M+1)/2$ (block 134) and then incremented (block 135) until z reaches the other end measure point, $z_{max}-(M-1)/2$. For each depth level in the range $(M+1)/2 \to z_{max}-(M-1)/2$ a new model conductivity is calculated in accordance with equation (3) (block 137). Reviewing to this point, and again using FIG. 9 for illustration, the loops 124 and 125 act to set $\hat{\sigma}_2(z) = \hat{\sigma}_1(z)$ for $z=1, 2, 3$ and $z=198, 199, 200$. The loop 133 then calculates the second model conductivities as $$\hat{\sigma}_2(z) = \hat{\sigma}_1(z) + \lambda E_1(z)$$

for all z in the range $4 \to 197$.

When the second set of model conductivities have all been calculated, the branch 136A of diamond 136 directs the program to reenter the loop 113 where the second set of simulated measurement values, $\hat{L}_2(z)$, and error values, $E_2(z)$, are generated. The new error values are again tested (loop 115) and, if found inadequate, a third set of model conductivities are generated (loops 124, 125, 133). This process continues in iterative fashion until $E_n(z)$ is found to be less than $\epsilon$ for all values of $a \leq z \leq b$. It is recognized, however, that for certain cases, and depending on the chosen size of $\epsilon$, that the prescribed minimum error condition may not be attainable, or, may require an unreasonably large number of iterations to attain. In such event, the decision diamond 121 prevents the program from performing more than a preselected number of iterations, $n_{max}$, by testing n before each new model is generated. When n reaches $n_{max}$, the program can be terminated and the appropriate parameters printed out.

Figure 11:
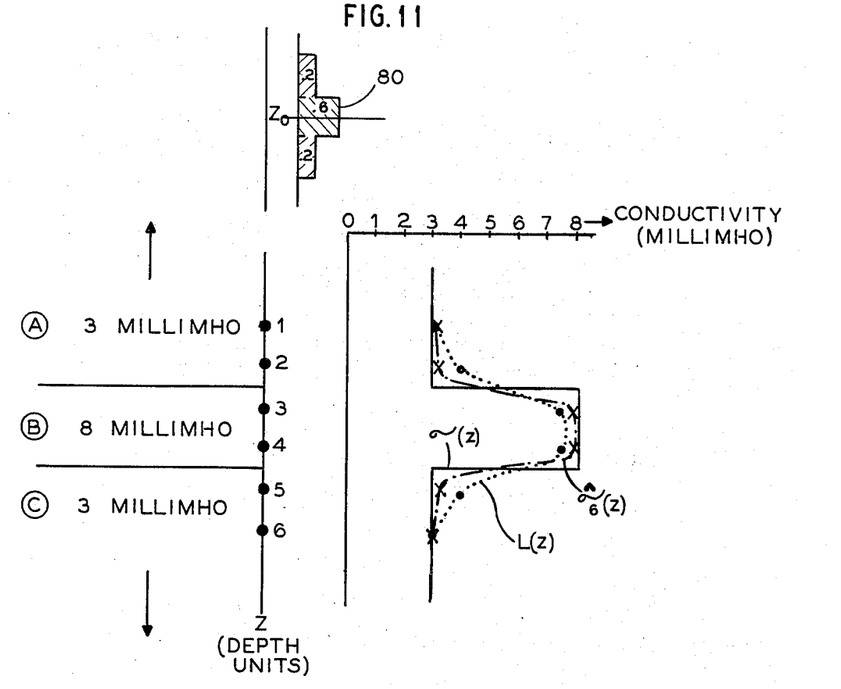
FIG. 11 illustrates an example which is helpful in visualizing the operation of the programmed method of FIG. 10.

An oversimplified example, described in conjunction with FIG. 11, is helpful in visualizing the operation of the programmed method of FIG. 10. It should be emphasized, however, that this example is merely intended to illustrate the mechanics of the method and is not to be taken as representing a real-life situation. In FIG. 11 there is shown a short depth interval which includes six depth levels from $z=1$ through $z=6$. Located at the depth levels $z=3$ and $z=4$ is a uniform formation bed B which is two depth intervals wide and has a conductivity of 8 millimhos. Above and below the bed B are wide beds A and C which can be thought of as extending to infinity in their respective directions. At the top of FIG. 11 there is shown a simplified graph which represents the normalized vertical response characteristic 80 of an imaginary well logging device. The characteristic 80 is symmetrical about its center $z_o$, and is three depth intervals wide. It includes three levels, each of one depth interval wide, having respective weighting factors of $w_{-1}=0.2$, $w_o=0.6$ and $w_1=0.2$.

Table I shows, at the top, a listing of the actual conductivities, $\sigma(z)$, at each depth level from $z=1$ to $z=6$, and a listing of "true measurement values", $L(z)$ which would be recorded at each of these points by a logging device having the response characteristic 80. Plots of $\sigma(z)$ (solid line) and $L(z)$ (dotted line) appear in FIG. 11 as a function of depth level. The Table I also includes six sets of figures representative of models, $\sigma_n(z)$, simulated measurements, $L_n(z)$, and error values, $E_n(z)$, which would be obtained during six successive iterations with the programmed method of FIG. 10. In obtaining the successive sets of figures, the model values and simulated measurement values at the end points, $z=1$ and $z=6$, are maintained constant throughout, the value of $\lambda$ utilized in equation (3) is taken as unity. It is seen that after six iterations the model conductivity values, $\sigma_6(z)$, yield simulated measurement values, $L_6(z)$, which closely approximate the true measurement values $L(z)$. A plot of $\sigma_6(z)$ is shown in dashed line with X's at indicated depth levels, and the improvement over the original model ($\sigma_1(z)=L(z)$) is readily apparent.

As above stated, the example of FIG. 11 is useful in visualizing the mechanics of the programmed method, but is an oversimplification in terms of a real-life situation. In more practical cases, the depth interval under consideration will be considerably larger and uneven in form, and the effective device response of greater vertical extent. Also, the measured signal will include the extraneous variations of noise. The choice of $\lambda=1$ in the example facilitates attainment of good results after a relatively small number of iterations. In general, however, larger or smaller values of $\lambda$ may be utilized, but unduly large values of $\lambda$ should be avoided so as to reduce the probability of obtaining a "divergent" result. A divergent condition is characterized by increases in the values of $E(z)$ for successively obtained models. Such condition has a tendency to occur when model changes which yield a reduction of error at a given depth level result in a disproportionate increase in the error at depth levels adjacent the given depth level.

The foregoing method of model generation has been described with reference to data processing techniques preferably implemented by the programming of a general purpose digital computer. However, it is to be understood that the method of the present invention could be implemented with other calculating apparatus, for example a special purpose analog or digital computer constructed to perform the described steps. Also, while an induction logging device has been used to illustrate the invented method, it should be again stressed that the invention also applies to other types of subsurface investigation devices.

What is claimed is:

1. A well logging method of plotting the variation with depth of a characteristic of the earth formation adjacent a borehole to a higher vertical resolution than that of the output of a well logging device passed through the borehole to initially measure said characteristic, comprising the steps of:
    (a) for each of a succession of depths in the borehole, producing a corresponding initial well logging measurement of said characteristic of the earth formation adjacent the borehole at said depth derived from a well logging device which is passed through the borehole and has a selected vertical response range and a selected vertical response characteristic,
    (b) storing, in a computer storage device, a selected variation of said characteristic with depth along the borehole,
    (c) generating new well logging measurements for said depths in the borehole by operating computer

TABLE I

| z | $\sigma(z)$ | $L(z)$ |
|---|---|---|
| 1 | 3 | 3 |
| 2 | 3 | 4 |
| 3 | 8 | 7 |
| 4 | 8 | 7 |
| 5 | 3 | 4 |
| 6 | 3 | 3 |

| z | $\hat{\sigma}_1(z)$ | $\hat{L}_1(z)$ | $E_1(z)$ | z | $\hat{\sigma}_2(z)$ | $\hat{L}_2(z)$ | $E_2(z)$ | z | $\hat{\sigma}_3(z)$ | $\hat{L}_3(z)$ | $E_3(z)$ |
|---|---|---|---|---|---|---|---|---|---|---|---|
| 1 | 3.00 | 3.00 | .00 | 1 | 3.00 | 3.00 | .00 | 1 | 3.00 | 3.00 | .00 |
| 2 | 4.00 | 4.40 | −.40 | 2 | 3.60 | 4.28 | −.28 | 2 | 3.32 | 4.15 | −.15 |
| 3 | 7.00 | 6.40 | .60 | 3 | 7.60 | 6.80 | .20 | 3 | 7.80 | 6.90 | .10 |
| 4 | 7.00 | 6.40 | .60 | 4 | 7.60 | 6.80 | .20 | 4 | 7.80 | 6.90 | .10 |
| 5 | 4.00 | 4.40 | −.40 | 5 | 3.60 | 4.28 | −.28 | 5 | 3.32 | 4.15 | −.15 |
| 6 | 3.00 | 3.00 | .00 | 6 | 3.00 | 3.00 | .00 | 6 | 3.00 | 3.00 | .00 |

| z | $\hat{\sigma}_4(z)$ | $\hat{L}_4(z)$ | $E_4(z)$ | z | $\hat{\sigma}_5(z)$ | $\hat{L}_5(z)$ | $E_5(z)$ | z | $\hat{\sigma}_6(z)$ | $\hat{L}_6(z)$ | $E_6(z)$ |
|---|---|---|---|---|---|---|---|---|---|---|---|
| 1 | 3.00 | 3.00 | .00 | 1 | 3.00 | 3.00 | .00 | 1 | 3.00 | 3.00 | .00 |
| 2 | 3.17 | 4.08 | −.08 | 2 | 3.09 | 4.04 | −.04 | 2 | 3.05 | 4.02 | −.02 |
| 3 | 7.90 | 6.95 | .05 | 3 | 7.95 | 6.98 | .02 | 3 | 7.97 | 6.99 | .01 |
| 4 | 7.90 | 6.95 | .05 | 4 | 7.95 | 6.98 | .02 | 4 | 7.97 | 6.99 | .01 |
| 5 | 3.17 | 4.08 | −.08 | 5 | 3.09 | 4.04 | −.04 | 5 | 3.05 | 4.02 | −.02 |
| 6 | 3.00 | 3.00 | .00 | 6 | 3.00 | 3.00 | .00 | 6 | 3.00 | 3.00 | .00 |

A further consideration relating to divergence is the basic sample interval $\Delta z_s$, or averaging interval $\Delta z_a$ (FIGS. 4 and 5), which can be used to determine the basic bed size of the model. It has been found that the utilization of wider basic beds in the model (for example $\Delta z_a = 2\Delta z_s$) improves the chances of obtaining a faster convergent solution. Of course, the averaging interval must not be chosen as unduly large or the lack of resolution of the resultant models will be self-defeating. The above-referenced copending applications of Regat, Kenyon and Frawley et al, deal in part with further techniques aimed at obtaining a convergent result in reasonable time.

circuits to apply the vertical response characteristic of the well logging device to said stored selected variation of the characteristic with depth along the borehole,
    (d) operating computer circuits to compare the initial and the new well logging measurements, and
    (e) modifying said selected variation of the measured characteristic with depth along the borehole by operating computer circuits in accordance with the comparison to produce thereby a modified variation with depth which conforms more closely to the initial logging measurements, and plotting said modified variation of the measured characteristic of the earth formation versus depth in the borehole to thereby produce a plot having higher vertical resolution than that determined initially by the extent of the vertical response range of the well logging device, said plot approximating the variation of the measured characteristic of the earth formation with depth in the borehole more closely than a plot of the initial well logging measurements versus depth in the borehole.

2. A well logging method as in claim 1 wherein the steps (c) through (e) are repeated a desired number of times in iterative fashion, the modified variation produced in step (e) of each iteration being utilized in step (c) for the next iteration in place of the previously selected variation or any previously modified variation.

3. A well logging method as in claim 1 wherein said selected variation is selected to conform to the initial well logging measurements.

4. A well logging method as in claim 3 wherein said selected variation consists of a plurality of values defining the measured characteristic of earth formation beds of equal thickness.

5. A well logging method as in claim 1 further comprising the step of generating a set of error values which are a function of the comparison of said new measurements to said initial measurements.

6. A well logging method as in claim 5 wherein the modifying step comprises modifying in accordance with said error values.

7. A well logging method of producing a representation of the variation with depth of a characteristic of the earth formation adjacent a borehole, to a higher vertical resolution than that of a well logging device passed through the borehole to initially measure said characteristic, comprising the steps of:
(a) for each of a succession of depths in the borehole, producing a corresponding well logging measurement of said characteristic of the earth formation adjacent the borehole at said depth derived from a well logging device which is passed through the borehole and has a selected vertical response range and a selected vertical response characteristic,
(b) storing, in a computer, a selected variation of said characteristic with depth along the borehole, said selected variation corresponding to discretely boundaried earth formation beds,
(c) generating, through use of the computer and said stored variation, new well logging measurements for said depths in the borehole by applying the vertical response characteristic of the well logging device to said selected variation,
(d) comparing the initial and the new well logging measurements through use of the computer, and
(e) modifying said selected variation of the measured characteristic with depth along the borehole in accordance with the comparison to produce, through use of the computer, a modified variation with depth conforming more closely to the initial logging measurements, and plotting said modified variation of the measured characteristic of the earth formation versus depth in the borehole to thereby produce a plot which tends to have higher vertical resolution than the extent of the vertical response range of the well logging device and tends to approximate the variation of the measured characteristic of the earth formation with depth in the borehole more closely than a plot of the initial well logging measurements versus depth in the borehole.

8. A well logging method as in claim 7 wherein the steps (c) through (e) are repeated a desired number of times in iterative fashion, the modified variation produced in step (e) of each iteration being utilized to generate the new well logging measurements in step (c) for the next iteration in place of the selected variation or any previously produced modified variation.

9. A well logging method as in claim 8 further comprising the step of generating a set of error values each time said initial well logging measurements are compared to said new well logging measurements.

10. A well logging method as in claim 9 wherein said selected variation is modified during each iteration in accordance with said error values.

11. A well logging method as in claim 7 wherein said selected variation is selected to conform to the initial well logging measurements.

12. A well logging method as in claim 11 wherein the selected variation and the modified variation comprise measurements of the characteristic of the earth formation for each of a plurality of beds of equal thickness.

13. A well logging method of producing a plot of the variation with depth of a characteristic of the earth formation adjacent a borehole, to a higher vertical resolution than that of a well logging device passed through the borehole to initially measure said characteristic, comprising the steps of:
(a) for each of a succession of depths in the borehole, producing a corresponding initial well logging measurement of said characteristic of the earth formation adjacent said depth derived from a well logging device which is passed through the borehole and has a selected vertical response range and a selected vertical response characteristic,
(b) storing, in a computer, a selected variation of said characteristic with depth along the borehole made up of values of said characteristic for discrete earth formation beds,
(c) programming and operating the computer to cause it to generate new well logging measurements for said depths in the borehole by applying the vertical response characteristic of the well logging device to the selected variation,
(d) programming and operating the computer to cause it to compare the initial and the new well logging measurements, and
(e) programming and operating the computer to cause it to modify the selected variation of the measured characteristic with depth along the borehole in accordance with the comparison so as to produce a modified variation with depth conforming more closely to the initial logging measurements, and plotting said modified variation of the measured characteristic of the earth formation versus depth in the borehole to thereby produce a plot which has higher vertical resolution than the extent of the vertical response range of the well logging device and approximates the variation of the measured characteristic of the earth formation with depth in the borehole more closely than a plot of the initial well logging measurements versus depth in the borehole.

14. A well logging method as in claim 13 including the step of programming and operating the computer to repeat the steps (c) through (e) a desired number of times in iterative fashion, the modified variation produced in carrying out step (e) of each iteration being utilized to generate the new measurements in step (c) of the next iteration.

15. A well logging method as in claim 13 wherein selected variation is selected to conform to the initial well logging measurements.

16. A well logging method as in claim 15 wherein said selected variation consists of values of said subsurface characteristic for each of a plurality of beds of equal thickness.

17. A well logging method as in claim 13 further comprising the steps of programming and operating the computer to generate a set of error values which are a function of the comparison of said initial well logging measurements to said new well logging measurements.

18. A well logging method as in claim 17 wherein said modifying comprises modifying the selected variation in accordance with said error values.

19. A well logging method of measuring the variation with depth of a characteristic of the earth formation adjacent a borehole, to a higher vertical resolution than that of a well logging device passed through the borehole to initially measure said characteristic, comprising the steps of:
 (a) for each of a succession of depths in the borehole, producing a corresponding well logging measurement of said characteristic of the earth formation adjacent said depth derived from a well logging device which is passed through the borehole,
 (b) providing a selected variation of said characteristic with depth along the borehole,
 (c) generating new well logging measurements for said depths in the borehole by applying the approximate vertical response characteristic of the well logging device to the selected variation of the characteristic with depth along the borehole,
 (d) comparing the initial and the new well logging measurements, and
 (e) modifying the selected variation of the measured characteristic with depth along the borehole in accordance with the comparison so as to produce a modified variation with depth conforming more closely to the initial logging measurements, said modified variation approximating the variation of the measured characteristic of the earth formation with depth in the borehole more closely than the original well logging measurements.

20. A well logging method as in claim 19 wherein the steps (c) through (e) are repeated a desired number of times in iterative fashion, the modified variation produced in step (e) of each iteration being utilized to generate the new measurements in step (c) for the next iteration.

21. A well logging method as in claim 19 wherein said selected variation is based on and derived from the initial well logging measurements.

22. A well logging method as in claim 21 wherein said selected variation consists of values of the earth formation characteristic for each of a plurality of beds of equal thickness.

23. A well logging method as in claim 19 further comprising the step of generating a set of error values which are a function of the comparison of said initial and new well logging measurements.

24. A well logging method as in claim 23 wherein said modifying comprises modifying in accordance with said error values.

25. A system for plotting the variation with depth of a subsurface characteristic of the earth formation adjacent a well which is substantially consistent with measurements taken in the well with a well logging device, comprising:
 means for deriving a set of initial measurement values which represent measurements taken over a depth interval of the well, and
 (b) means for:
  (i) providing a trial variation with depth of said subsurface characteristic,
  (ii) generating a set of new measurement values by applying the approximate response characteristic of the well logging device to the trial variation,
  (iii) comparing the new measurement values to the initial measurement values,
  (iv) modifying the trial variation in accordance with the comparison, and
  (v) plotting the so-modified variation with depth in the well of said subsurface characteristic of the earth formation adjacent the well.

26. A method of exploring a subsurface earth formation comprising:
 (a) producing initial well logging measurements derived from a well logging device passed through a well in the subsurface earth formation and operated to take said initial measurements of a characteristic of the earth formation adjacent the well at selected depths in the well, said logging device having a certain vertical response range and a certain vertical response characteristic,
 (b) producing a selected trial variation, with depth in the well, of the characteristic of the subsurface earth formation,
 (c) generating new well logging measurements for said depths in the well, by applying the vertical response characteristic of the well logging device to said selected trial variation with depth in the well of the characteristic of the earth formation,
 (d) comparing the new and initial well logging measurements at respective depths in the well,
 (e) modifying the selected trial variation in accordance with the comparison between the new and initial measurements so as to produce a new selected trial variation capable of yielding further new well logging measurements, conforming more closely to the initial well logging measurements, when the vertical response characteristic of the well logging device is applied to the new selected trial variation, and
 (f) plotting the new selected trial variation of the measured characteristic of the earth formation versus depth in the well to thereby produce a plot having higher vertical resolution than that determined initially by the extent of the vertical response range of the well logging device.

* * * * *